United States Patent
Kato et al.

[11] Patent Number: 6,086,992
[45] Date of Patent: Jul. 11, 2000

[54] RESIN-COATED ALUMINUM ALLOY PLATE MATERIAL

[75] Inventors: Osamu Kato; Fumiharu Jito; Hideharu Nakayama; Takahiro Sato; Masaru Ota, all of Tokyo, Japan

[73] Assignee: The Furukawa Electric Co., Ltd., Tokyo, Japan

[21] Appl. No.: 09/017,498

[22] Filed: Feb. 2, 1998

[30] Foreign Application Priority Data

Feb. 3, 1997 [JP] Japan .................................. 9-020791
Dec. 5, 1997 [JP] Japan .................................. 9-336072

[51] Int. Cl.$^7$ .......................... B32B 15/08; B32B 15/20; B32B 27/06; G11B 23/03
[52] U.S. Cl. ....................... 428/336; 428/458; 428/480; 428/484; 360/133; 106/14.34
[58] Field of Search ................................. 428/650, 687, 428/421, 457, 215, 220, 332, 337, 336, 484, 458, 480, 66.6; 106/14.34, 14.41, 660; 360/132, 133

[56] References Cited

U.S. PATENT DOCUMENTS

| | | | |
|---|---|---|---|
| 3,997,694 | 12/1976 | Wu | 428/35 |
| 4,911,954 | 3/1990 | Tatsuno et al. | 427/409 |
| 4,983,454 | 1/1991 | Hiraki et al. | 428/335 |
| 5,249,447 | 10/1993 | Aizawa et al. | 72/46 |
| 5,290,828 | 3/1994 | Craun et al. | 523/423 |
| 5,512,111 | 4/1996 | Tahara et al. | 148/440 |
| 5,582,319 | 12/1996 | Heyes et al. | 220/454 |
| 5,658,701 | 8/1997 | Kato | 430/49 |
| 5,898,042 | 4/1999 | Sawada et al. | 523/201 |

FOREIGN PATENT DOCUMENTS

| | | |
|---|---|---|
| 4-330683 | 11/1992 | Japan . |
| 6-111516 | 4/1994 | Japan . |
| 6-346178 | 12/1994 | Japan . |
| 8-104939 | 4/1996 | Japan . |
| 8-161849 | 6/1996 | Japan . |
| 8-306155 | 11/1996 | Japan . |
| 9-192601 | 7/1997 | Japan . |

*Primary Examiner*—Deborah Jones
*Assistant Examiner*—Michael LaVilla
*Attorney, Agent, or Firm*—Birch, Stewart, Kolasch & Birch, LLP

[57] ABSTRACT

A resin-coated aluminum alloy plate material good in flaw resistance, formability and/or workability, and printability, which comprises an aluminum alloy plate, whose Vickers hardness (Hv) is 30 or more, and an organic resin film having a thickness of 0.5 $\mu$m or more, but 20 $\mu$m or less, and containing a resin, whose glass transition temperature (Tg) is 10° C. or less, and a wax and/or a fluororesin-series lubricant in an added amount of 1 to 30% by weight based on the solid content in the organic resin film, the organic resin film being coated on a surface of the aluminum alloy plate. The resin-coated aluminum alloy plate material has good flaw resistance, formability and/or workability, and printability, and can be preferably used as a shutter material of a recording medium cassette.

6 Claims, 1 Drawing Sheet

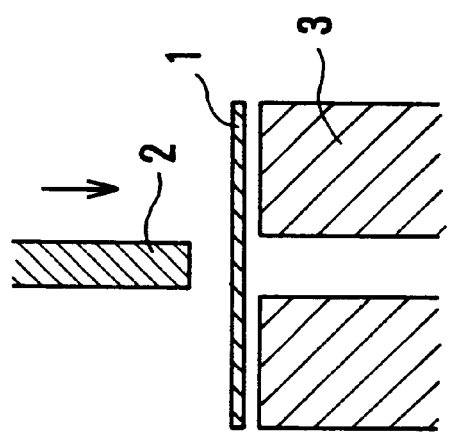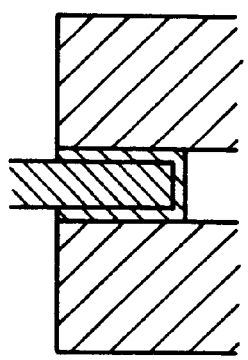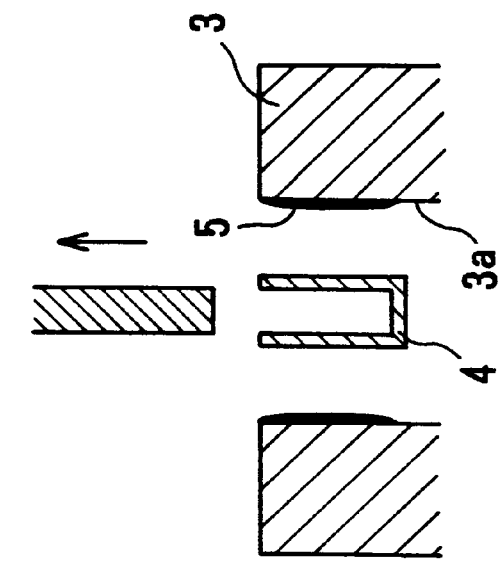

RESIN-COATED ALUMINUM ALLOY PLATE MATERIAL

FIELD OF THE INVENTION

The present invention relates to a resin-coated aluminum alloy plate material that is used, for example, as a shutter material of recording medium cassettes used in computers, sound recording/reproducing machinery and tools, etc. More specifically, the present invention relates to a resin-coated aluminum alloy plate material good in flaw resistance, formability and/or workability, and printability, suitable for the above application and the like.

BACKGROUND OF THE INVENTION

A disk cassette wherein a magnetic disk, such as a flexible disk, for computers, or another disk that is operated in a magnetic manner, electrostatic manner, optical manner, or another manner, is housed in a case made of a resin and the like, is provided with an opening section through part of the case. This opening section can be opened or closed by a shutter that can be slid to the left or right so that a head, such as a magnetic head, is accessible to the disk.

Conventionally, the material used to manufacture the disk shutter is stainless steel or synthetic resin. However, the disk shutters wherein these materials are used are accompanied by the following problems.

First, a shutter made of a stainless steel is heavy and high in cost. In addition, a shutter made of stainless steel lacks satisfactory affinity with printing ink when letters (characters) or the like are printed on the surface, and there is also a problem on the adhesion of the printed letters.

On the other hand, a shutter using a synthetic resin is readily charged with static electricity, to attach dust and dirt, leading to a problem that adversely affects the disk in the case. Further, like a shutter made of a stainless steel, the printability is poor. In addition, there is also a problem on the dimensional accuracy of the shutter.

In recent years, as materials used to make the disk shutter, aluminum alloys have been proposed. JU-A-1-181171 ("JU-A" means unexamined published Japanese utility model application) and JP-A-6-111516 ("JP-A" means unexamined published Japanese patent application) propose, as a shutter material, aluminum alloy materials each provided with an oxide film (Alumite or Alumirite film) on anode, and JP-A-6-346178, JP-A-9-192601, JP-A-8-104939, and JP-A-8-161849 propose resin-coated aluminum alloy materials.

However, the aluminum alloy materials provided with an oxide film on anode have the problem that the film is apt to be cracked at the part where the aluminum alloy material is bent at an angle of 90°, and peeling of the film and the contact of the aluminum alloy material with a mold bring about tailings (residual substances) when the aluminum alloy material is worked with the mold. Further, it may occur that the cracks spread (are propagated) to the base material, and as a result the aluminum alloy material breaks at the part where it is bent at an angle of 90°.

On the other hand, with respect to the resin-coated aluminum alloy materials, JP-A-6-346178 propose forming an ethylene acrylic-series, epoxy-series, or epoxyacrylic-series resin coating film containing a given amount of an inner wax, and Japanese patent application No. 8-23142(1996) proposes forming an ionomer resin coating film containing a given amount of a petroleum wax.

However, in these conventional resin-coated aluminum alloy materials, when they are manufactured into articles desired through a variety of steps, such as a press-forming step and an assembling step, scratches and/or bruises are liable to occur during the handling by a worker or the transfer or transportation of the articles, and thus the commercial value thereof is lowered considerably, in some cases.

To improve the flaw resistance of resin-coated aluminum alloy materials, an attempt is made to secure the film hardness by adding colloidal silica to the film, as proposed in JP-A-8-104939, or an attempt is made to improve the flaw resistance by applying a silicate compound containing silica ($SiO_2$) and $M_2O$, wherein M is Li, Na, or K, as proposed in JP-A-8-161849. However, even these are not satisfactory in flaw resistance in fact. These resin-coated aluminum alloy materials have such problems that the part where the material is bent at an angle of 90° is apt to break, tailings easily occurs during continuous forming and/or working and the tailings readily accumulate during the operation, and the adhesion of printing ink at the time of printing is not satisfactory.

SUMMARY OF THE INVENTION

Taking the above problems into account, an object of the present invention is to provide a resin-coated aluminum alloy plate material that is good in flaw resistance, formability and/or workability, and printability and used preferably as a shutter material of a recording medium cassette.

Other and further objects, features, and advantages of the invention will appear more fully from the following description, taken in connection with the accompanying drawing.

BRIEF DESCRIPTION OF THE DRAWING

FIG. 1 is a schematic view in cross section showing the step of forming (working) a sample for a test on continuous formability.

DETAILED DESCRIPTION OF THE INVENTION

The inventors of the present invention, having keenly studied the above resin-coated metal materials, have found that the above object can be attained by providing an aluminum alloy plate material wherein a surface of an aluminum alloy plate, whose Vickers hardness (Hv) is 30 or more, is coated with an organic resin film having a thickness of 0.5 $\mu$m or more, but 20 $\mu$m or less, and made of a resin composition that is a combination of a resin, whose glass transition temperature (Tg) is 10° C. or less, with a wax and/or a fluororesin-series lubricant in an amount of 1 to 30% by weight, leading to the completion of the present invention base on this finding.

Namely, the present invention provides:

(1) A resin-coated aluminum alloy plate material good in flaw resistance, formability and/or workability, and printability, which comprises an aluminum alloy plate, whose Vickers hardness (Hv) is 30 or more, and an organic resin film having a thickness of 0.5 $\mu$m or more, but 20 $\mu$m or less, and containing a resin, whose glass transition temperature (Tg) is 10° C. or less, and a wax and/or a fluororesin-series lubricant in an added amount of 1 to 30% by weight based on the solid content in the organic resin film, the organic resin film being coated on a surface of the aluminum alloy plate;

(2) The resin-coated aluminum alloy plate material as stated in the above (1), which comprises the aluminum alloy plate, whose Vickers hardness (Hv) is 30 or more, and the organic resin film having a thickness of 0.5 μm or more, but 10 μm or less, and containing the resin, whose glass transition temperature (Tg) is 10° C. or less, and the wax and/or the fluororesin-series lubricant in an added amount of 1 to 30% by weight based on the solid content in the organic resin film, the organic resin film being coated on a surface of the aluminum alloy plate;

(3) The resin-coated aluminum alloy plate material as stated in the above (1) or (2), wherein the said resin is a polyester-series resin;

(4) The resin-coated aluminum alloy plate material as stated in the above (1), (2), or (3), containing an unsaturated polyester in an amount of 0.1% by weight or more, but 20% by weight or less, based on the solid content of the resin; and (5) The resin-coated aluminum alloy plate material as stated in the above (1), (2), (3), or (4), which is used as a material for a recording medium cassette shutter.

Hereinbelow the present invention is described in detail.

The aluminum alloy plate material used in the present invention is not particularly restricted, except that it has a Vickers hardness (Hv) of 30 or more. If the aluminum alloy plate material has a Vickers hardness (Hv) of less than 30, the aluminum alloy itself is soft, and even when the organic resin film as defined in the present invention is provided, the aluminum alloy is apt to be deformed plastically and to exhibit flaws when a force is exerted on the film. Therefore, the Vickers hardness is required to be 30 or more. 3,000 (Al—Mn)-series and 5,000 (Al—Mg)-series aluminum alloy plate materials are preferable, because they are enough high in Vickers hardness and excellent in the formability and/or workability of the aluminum alloys themselves. The thickness of the aluminum alloy plate material is not particularly restricted and can be suitably selected to meet, for example, the type, the application, the size, and the shape of the intended molded product.

In the present invention, the resin film exhibits cushioning properties. As a result of various investigations, the inventors of the present invention have attempted to improve flaw resistance based on an idea of making a film have cushioning properties (elasticity), which idea is different from, rather converse of, conventional ideas. That is, even when the film comes in contact with an object that will cause a flaw, and the film is deformed as a result, the film can restore its original state due to the effect of the cushioning properties of the film, and therefore flaws are hardly occurred on the film. As a result of the intensive investigations made by the inventors of the present invention, it has been found that the cushioning properties of a film depend greatly on the glass transition temperature (Tg) of the resin constituting the film, and that the above object of the invention can be attained by containing 1 to 30% by weight of a wax and/or a fluororesin-series lubricant in a resin having a Tg of 10° C. or less. It has also been found that, because the resin coating layer of the aluminum alloy plate material of the present invention does not become hard due to the above constitution, the film is not peeled off when the aluminum alloy plate material is formed and/or worked, for example, by bending and cutting, and the continuous workability of the aluminum alloy plate material is quite good.

If a resin having a Tg of over 10° C. is used, the cushioning effect of the organic resin film is unsatisfactory, and a satisfactory flaw resistance cannot be obtained.

Further, in the present invention, if the wax and/or the fluororesin-series lubricant is not contained in the resin, the surface slip properties are unsatisfactory, and high flaw-resistance cannot be exhibited when the aluminum alloy plate material comes in the contact with an object. If the amount of the wax and/or the fluororesin-series lubricant is less than 1% by weight, the flaw resistance is not satisfactory, and the effect of improving formability and/or workability is not satisfactory. If the amount of the wax and/or the fluororesin-series lubricant is more than 30% by weight, the formability and/or workability is lowered, due to an extension of the resin film and a decrease in the strength of the resin film, and the flaw resistance is also unsatisfactory, as well as that the printability is lowered. Therefore, in the present invention, the amount of the wax and/or the fluororesin-series lubricant to be added is 1 to 30% by weight, and preferably 2 to 10% by weight.

The resin used in the present invention is a resin having a Tg of 10° C., or less, and preferably −50 to 7° C., and it may be a homopolymer or a copolymer, or a single resin or a mixture of resins. Since the resin-coated aluminum alloy plate material of the present invention is used, for example, as a shutter material for a recording medium cassette, preferably the resin is a polyester-series resin in respect of the flaw resistance, the printability, and the formability and/or workability. As the hardener, for example, a generally used melamine resin can be used.

In the present invention, to improve the printability further, preferably an unsaturated polyester is added, in an amount of 0.1% by weight or more, but 20% by weight or less, more preferably 0.1% by weight or more, but 10% by weight or less, based on the solid content of the resin. If the amount of the unsaturated polyester is too small, a satisfactory effect of improving printability cannot be obtained, in some cases, while if the amount of the unsaturated polyester is too large, the bending workability becomes deteriorated, in some cases. As the unsaturated polyester, a generally used unsaturated polyester may be used, such as an unsaturated polyester obtained by reacting an unsaturated acid with a polyol and dissolving the obtained product in styrene. As the unsaturated acid, for example, maleic anhydride, phthalic acid, and itaconic acid can be mentioned, and as the polyol, an aliphatic polyol is preferable, for example, ethylene glycol, propylene glycol, 1,3-butanediol, 1,4-butanediol, 1,5-pentanediol, neopentyl glycol, diethylene glycol, dipropylene glycol, triethylene glycol, and tripropylene glycol can be mentioned.

Examples of the wax and the fluororesin-series lubricant that can be used in the present invention include, as the wax, a polyolefin wax, such as a polyethylene wax and a polypropylene wax, a petroleum wax, such as a paraffin wax and a microcrystalline wax, and a natural wax, such as carnauba wax, and, as the fluororesin-series lubricant, a fluorine compound, such as a polyethylene tetrafluoride (PTFE) and a polyvinylidene fluoride. The melting point of these lubricants is not particularly restricted, and preferably it is in the range of 150 to 350° C. These may be added singly or in combination of two or more, in an amount of 1 to 30% by weight.

The thickness of the organic resin film in the present invention is 0.5 μm or more, but 20 μm or less, preferably 0.5 μm or more, but 10 μm or less, and more preferably 1 μm or more, but 3 μm or less. If the thickness of the organic resin film is less than 0.5 μm, the cushioning effect and the flaw resistance are not satisfactory, and the formability and/or workability and the corrosion resistance are poor. On the other hand, if the thickness of the organic resin film is over 20 μm, the internal stress of the film increases, to lower the adhesion, the film peels off at the time of forming and/or working, to generate tailings, to lower the continuous formability and/or workability, and it is not economical. In the present invention, generally, the organic resin film is coated on one surface of an aluminum alloy plate material, but it may be coated suitably on both surfaces of an aluminum alloy plate material.

The above organic resin film can be formed by applying the above resin composition on an aluminum alloy plate material and drying the resin composition. As the applying method, for example, the roll squeeze method, the chemicoater method, the roll coater method, the air-knife method, the dipping method, the spraying method, and the electrostatic coating method can be used. The drying can be carried out, for example, by the heating method or the induction heating method that is generally used.

In the present invention, to improve further the corrosion resistance or the adhesion of film, it is effective to carry out surface treatment of an aluminum alloy plate to apply an undercoat of the organic resin film, for example, with a chemical conversion treatment. In the case of aluminum, the surface treatment is preferably selected from a chromate-series, a zirconium-series, or a titanium-series. They may be any of the rinsing type by dipping or spraying, and the coating type by a roll coater.

Further, to the organic resin film for use in the present invention, may be added a coloring pigment or a dye, to improve the property on design. In addition, various additives, such as a surface-active agent, a leveling agent, a suspending agent, an antistatic agent, a mildewproofing agent, an antimicrobiral agent, and a thickening agent, can be added, in respective amounts in ranges that do not affect the desired flaw resistance, formability and/or workability, and printability.

The resin-coated aluminum alloy plate material of the present invention has at least a high flaw resistance, formability and/or workability, and printability, and it can be used in any application where all these properties are required. Specifically, the resin-coated aluminum alloy plate material of the present invention is used typically as a shutter material for a recording medium cassette, as described above, but the application is not limited to it.

The resin-coated aluminum alloy plate material of the present invention has a high flaw resistance, workability in bending, continuous formability, and printability; it is also excellent in corrosion resistance; and it can be preferably used, for example, as a material for a recording medium cassette shutter.

Hereinbelow, the effects of the present invention are specifically described in more detail by referring to Examples and Comparative Examples, but the present invention is not limited to these Examples.

EXAMPLE

Each aluminum alloy plate, measuring 200 mm by 300 mm in thickness of 0.2 mm, was degreased with a commercially available degreasing agent; it was subjected to etching treatment and was washed with water, and it was subjected to surface treatment with a commercially available solution for chemical conversion treatment, and the resultant plate was coated with the organic resin film, as shown in Table 5, to prepare each sample.

The materials of the aluminum alloy plates, the base resins, the acid components of the unsaturated polyesters, and the lubricants, each of which were used herein, are shown in Tables 1, 2, 3, and 4, respectively. In Table 2, Resins a to c were polyester resins having different glass transition temperatures, manufactured by Takeda Verdish Urethane Kogyo Co. Resin f was a resin prepared by polymerizing ethyl acrylate in a solvent, Resin h was a resin prepared by polymerizing methyl methacrylate in a solvent, and Resins g and i were, respectively, an epichrolohydrin/bisphenol A-type resin having a glass transition temperature of 9° C. (g), and an epichrolohydrin/bisphenol A-type resin having a glass transition temperature of 35° C. (i). The unsaturated polyester resins used were those which were obtained by reacting each of the acid components shown in Table 3 with propylene glycol and dissolving the products in styrene.

The thus-obtained samples were subjected to the following evaluation tests:

(1) Flaw Resistance Test

The sample was rubbed with a stainless steel brush and a polypropylene brush, under a load of 500 g, for 100 reciprocating strokes, and the extent of damage by flaws on the film of the sample was visually evaluated.

[Criteria of Evaluation]

|  | Damaged Area Rate ((damaged film area/rubbed area) × 100) |
| --- | --- |
| ⊚: no film damage | 0% |
| ○: little film damage | over 0% but 10% or less |
| Δ: slight film damage | over 10% but 25% or less |
| x: serious film damage | over 25% |

(2) Bending-Workability Test

The sample was bent (1T-180°), and the cracks in the film at the bent part were visually evaluated.

[Criteria of Evaluation]

⊚: no film crack
○: very small film cracks
Δ: small film cracks
x: large film cracks and peeling of the film was observed (3) Continuous Formability Each of the samples as prepared in the above manner was cut into a plate 1, measuring 40 mm×60 mm, and it was bent by a punch 2 and a mold 3, using a high-speed forming machine at a forming speed of 200 mm/sec, as shown in FIGS. 1A, 1B, and 1C (the undersurface was the resin-coated surface), to form a U-shaped formed item 4, with the bent part having a width of 4 mm and the opposite sides having a length of 28 mm. After 100,000 shots, the weight of coating film tailings 5 adhered to the inner walls 3a of the mold 3 was measured.

[Criteria of Evaluation]

Produced Amount of Film Tailings

⊚: less than 50 mg
○: 50 mg or more but less than 200 mg
Δ: 200 mg or more but less than 500 mg
x: 500 mg or more (4) Printability Test Each of the samples was printed with a silk screen ink, and after the ink was cured with UV, the adhesion to the ink was evaluated by the non-peeled ratio of the cross cuts, by the cross-cut adhesion test using peeling off of a tape. The silk screen ink used was RIG (trade name; a UV-curing ink for metals, manufactured by Seiko Advance Co.).

[Criteria of Evaluation]

|  | (non-peeled ratio of cross-cuts) |
|---|---|
| ⊚: not peeled | 100/100 |
| Δ: partially peeled | (more than 0 but less than 100)/100 |
| ×: all peeled | 0/100 |

(5) Corrosion Resistance Test

After each of the samples was subjected to the salt spray test for 200 hours based on JIS Z2371, the area where white rust occurred was measured.

[Criteria of Evaluation]
⊚: the area where white rust occurred was 2% or less.
○: the area where white rust occurred was 2% or more but less than 5%.
Δ: the area where white rust occurred was 5% or more but less than 10%.
×: the area where white rust occurred was 10% or more.

The results of the tests are shown in Table 5.

TABLE 1

Aluminum alloy materials

| Symbol | Aluminum alloy material | Vickers hardness (Hv) |
|---|---|---|
| A | 1100-H24 | 30 |
| B | 3003-O | 32 |
| C | 3004-H34 | 65 |
| D | 3004-O | 50 |
| E | 5052-O | 45 |
| F | 5182-H38 | 105 |
| G | 5182-O | 80 |
| H | 1100-O | 18 |

TABLE 2

Base resins

| Symbol | Glass transition temperature (Tg: °C.) | Resin-series |
|---|---|---|
| a | 10 | polyester |
| b | −10 | polyester |
| c | −39 | polyester |
| d | 15 | polyester |
| e | 51 | polyester |
| f | −22 | acrylic |
| g | 9 | epoxy |
| h | 105 | acrylic |
| i | 35 | epoxy |

TABLE 3

Acid components of unsaturated polyesters

| Symbol | Unsaturated acid component |
|---|---|
| α | maleic anhydride |
| β | phthalic acid |
| γ | itaconic acid |

TABLE 4

Lubricants

| Symbol | Lubricant |
|---|---|
| ① | polyolefin wax |
| ② | carnauba wax |
| ③ | polyethylene tetrafluoride |
| ④ | polyvinylidene fluoride |

TABLE 5

|  |  | Organic resin film | | | | | Test results | | | | |
|---|---|---|---|---|---|---|---|---|---|---|---|
|  | Sample | Aluminum alloy material | Base resin | Unsaturated polyester (wt %)* | Lubricant (wt %)* | | Thickness (μm) | Flaw resistance | Bending workability | Continuous formability | Printability | Corrosion resistance |
| This invention | 1 | A | a | α (0.2) | ① | (1) | 0.6 | ⊚ | ⊚ | ⊚ | ⊚ | ⊚ |
|  | 2 | B | a | β (5) | ② | (5) | 1 | ⊚ | ⊚ | ⊚ | ⊚ | ⊚ |
|  | 3 | C | a | γ (15) | ③ | (10) | 2 | ⊚ | ⊚ | ⊚ | ⊚ | ⊚ |
|  | 4 | D | a | β (3) | ④ | (20) | 3 | ⊚ | ⊚ | ⊚ | ⊚ | ⊚ |
|  | 5 | E | b | γ (8) | ① + ② | (24) | 6 | ⊚ | ⊚ | ⊚ | ⊚ | ⊚ |
|  | 6 | F | b | α (19) | ② + ④ | (29) | 9 | ⊚ | ⊚ | ⊚ | ⊚ | ⊚ |
|  | 7 | F | b | γ (7) | ③ | (3) | 10 | ⊚ | ⊚ | ⊚ | ⊚ | ⊚ |
|  | 8 | F | b | α (13) | ④ | (7) | 13 | ○ | ○ | ○ | ⊚ | ⊚ |
|  | 9 | F | c | β (18) | ① | (11) | 15 | ○ | ○ | ○ | ⊚ | ⊚ |
|  | 10 | F | c | α (6) | ② | (17) | 16 | ○ | ○ | ○ | ⊚ | ⊚ |
|  | 11 | F | c | β (10) | ① + ③ | (21) | 17 | ○ | ○ | ○ | ⊚ | ⊚ |
|  | 12 | F | c | γ (20) | ③ | (28) | 19 | ○ | ○ | ○ | ⊚ | ⊚ |
|  | 13 | F | a | none | ① | (17) | 7 | ⊚ | ⊚ | ⊚ | Δ | ⊚ |
|  | 14 | F | f | none | ① + ② | (10) | 9 | Δ | Δ | ⊚ | Δ | ⊚ |
|  | 15 | F | g | none | ③ | (7) | 3 | Δ | Δ | ⊚ | Δ | ⊚ |
|  | 16 | F | a | β (0.05) | ① | (6) | 5 | ⊚ | ⊚ | ⊚ | Δ | ⊚ |
|  | 17 | F | b | α (22) | ② | (3) | 4 | ⊚ | Δ | ⊚ | ⊚ | ⊚ |
| Comparative Example | 18 | H | a | α (5) | ② | (8) | 2 | × | ⊚ | ⊚ | ⊚ | ⊚ |
|  | 19 | F | d | none | ③ | (3) | 5 | × | Δ | ⊚ | Δ | ⊚ |
|  | 20 | F | e | none | ① | (9) | 10 | × | Δ | ⊚ | Δ | ⊚ |
|  | 21 | F | h | none | ② | (2) | 1 | × | × | ⊚ | × | ⊚ |

TABLE 5-continued

| | | Organic resin film | | | | | Test results | | | |
|---|---|---|---|---|---|---|---|---|---|---|
| Sample | Aliminum alloy material | Base resin | Unsaturated polyester (wt %)* | Lubricant (wt %)* | | Thickness (μm) | Flaw resistance | Bending workability | Continuous formability | Printability | Corrosion resistance |
| 22 | F | i | none | ②+③ | (3) | 6 | x | x | Δ | x | ⊚ |
| 23 | F | b | β (5) | ③ | (0.1) | 8 | x | ○ | ⊚ | ⊚ | ⊚ |
| 24 | F | c | γ (3) | ① | (33) | 10 | x | Δ | ○ | x | ⊚ |
| 25 | F | a | β (6) | ①+③ | (9) | 0.2 | x | ⊚ | ⊚ | ⊚ | Δ |
| 26 | F | c | γ (1) | ② | (2) | 25 | ⊚ | Δ | x | ⊚ | ⊚ |

(Note) *Proportion based on the solid content of the base resin

As is apparent from the results shown in Table 5, it can be understood that Samples 1 to 17, which were Examples of the present invention, were each good in flaw resistance, workability in bending, continuous formability, and printability by the printing ink, as well as in corrosion resistance, and they are preferable as a shutter material for recording medium cassettes. In comparison to Samples 1 to 7, the films of Samples 8 to 12 were thick, and therefore they were slightly low in flaw resistance, workability in bending, and continuous formability, but these do not lead to any practical problems. Sample 13 was an example in which no unsaturated polyester was used, and in comparison with Samples 1 to 12, Sample 13 was a little poor in printability, but that does not lead to a problem. Since, in Sample 16, the amount of the unsaturated polyester was very small, the effect of improving printability was less, while since, in Sample 17, the amount of the unsaturated polyester was large, and the workability in bending was lowered. Samples 14 and 15 were examples in which the non-polyester-series resins were used, and in comparison with Samples 1 to 7, they were a little low in flaw resistance, workability in bending, and printability.

In contrast, Samples 18 to 26, which were Comparative Examples, were defective in any of flaw resistance, workability in bending, continuous formability, and printability, and therefore they fall short of the intended criteria.

Sample 18 was insufficient in the hardness of the aluminum alloy material, and it was defective in flaw resistance.

In Samples 19 to 22, resins having high glass transition temperatures were used for the films, and therefore the flaw resistance was defective, and further, Samples 21 and 22 were also poor in bending-workability and printability.

In Sample 23, since the amount of the lubricant was too small, the surface slip property was unsatisfactory, and the flaw resistance was defective. Further, in Sample 24, since the amount of the lubricant was too large, the film strength was lowered, to make the flaw resistance defective, and the printability was poor.

In Sample 25, the film was too thin, and therefore the flaw resistance was defective. In Sample 26, since the film was too thick, the film easily peeled off when bending was carried out, and a large amount of tailings were produced when press-forming was carried out.

Having described our invention as related to the present embodiments, it is our intention that the invention not be limited by any of the details of the description, unless otherwise specified, but rather be construed broadly within its spirit and scope as set out in the accompanying claims.

What we claim is:

1. A resin-coated aluminum alloy plate material good in flaw resistance, formability and/or workability, and printability, which comprises an aluminum alloy plate, whose Vickers hardness (Hv) is 30 or more, and an organic resin film having a thickness of 0.5 μm or more, but 20 μm or less, and containing a polyester series resin, whose glass transition temperature (Tg) is 10° C. or less, and a wax and/or a fluororesin-series lubricant in an added amount of 1 to 30% by weight based on the solid content in the organic resin film, the organic resin film being coated on a surface of the aluminum alloy plate.

2. The resin-coated aluminum alloy plate material as claimed in claim 1, which comprises the aluminum alloy plate, whose Vickers hardness (Hv) is 30 or more, and the organic resin film having a thickness of 0.5 μm or more, but 10 μm or less, and containing the resin, whose glass transition temperature (Tg) is 10° C. or less, and the wax and/or the fluororesin-series lubricant in an added amount of 1 to 30% by weight based on the solid content in the organic resin film, the organic resin film being coated on a surface of the aluminum alloy plate.

3. The resin-coated aluminum alloy plate material as claimed in claim 1, containing an unsaturated polyester in an amount of 0.1% by weight or more, but 20% by weight or less, based on the solid content of the resin.

4. A material for a recording medium cassette shutter, which comprises the resin-alloy plate material as claimed in claim 1.

5. The resin-coated aluminum alloy plate material as claimed in claim 1, wherein the said aluminum alloy plate is an Al—Mn-series or Al—Mg-series alloy plate.

6. The resin-coated aluminum alloy plate material as claimed in claim 1, further comprising an undercoat.

* * * * *